US010902571B2

(12) United States Patent
Naruniec et al.

(10) Patent No.: US 10,902,571 B2
(45) Date of Patent: Jan. 26, 2021

(54) AUTOMATED IMAGE SYNTHESIS USING A COMB NEURAL NETWORK ARCHITECTURE (71) Applicant: Disney Enterprises, Inc., Burbank, CA (US)

(72) Inventors: Jacek Naruniec, Zürich (CH); Romann Weber, Zürich (CH); Christopher Schroers, Zürich (CH)

(73) Assignee: Disney Enterprises, Inc., Burbank, CA (US)

( * ) Notice: Subject to any disclaimer, the term of this patent is extended or adjusted under 35 U.S.C. 154(b) by 33 days.

(21) Appl. No.: 16/447,768

(22) Filed: Jun. 20, 2019

(65) Prior Publication Data

US 2020/0372621 A1 Nov. 26, 2020

Related U.S. Application Data (60) Provisional application No. 62/850,439, filed on May 20, 2019.

(51) Int. Cl.
*G06K 9/62* (2006.01)
*G06T 5/50* (2006.01)
(Continued)

(52) U.S. Cl.
CPC .............. *G06T 5/50* (2013.01); *G06N 3/04* (2013.01); *G06N 3/0454* (2013.01); *G06N 3/088* (2013.01);
(Continued)

(58) Field of Classification Search
CPC ... G06T 5/50; G06T 7/32; G06T 2207/10004; G06T 2207/10016; G06T 2207/20081;
(Continued)

(56) References Cited

U.S. PATENT DOCUMENTS

2014/0035929 A1 2/2014 Matthews et al.
2019/0220977 A1* 7/2019 Zhou ......................... G06T 5/50
(Continued)

FOREIGN PATENT DOCUMENTS

WO WO2020190729 A1 9/2020

OTHER PUBLICATIONS

"On Face Segmentation, Face Swapping, and Face Perception" by Nirkin et al. (Apr. 2017).
(Continued)

*Primary Examiner* — Xin Jia
(74) *Attorney, Agent, or Firm* — Farjami & Farjami LLP (57) ABSTRACT An image synthesis system includes a computing platform having a hardware processor and a system memory storing a software code including a neural encoder and multiple neural decoders each corresponding to a respective persona. The hardware processor executes the software code to receive target image data, and source data that identifies one of the personas, and to map the target image data to its latent space representation using the neural encoder. The software code further identifies one of the neural decoders for decoding the latent space representation of the target image data based on the persona identified by the source data, uses the identified neural decoder to decode the latent space representation of the target image data as the persona identified by the source data to produce a swapped image data, and blends the swapped image data with the target image data to produce one or more synthesized images.

20 Claims, 6 Drawing Sheets (51) Int. Cl.
  *G06T 7/32* (2017.01)
  *G06N 3/04* (2006.01)
  *G06N 3/08* (2006.01)
(52) U.S. Cl.
  CPC ...... *G06T 7/32* (2017.01); *G06T 2207/10004* (2013.01); *G06T 2207/10016* (2013.01); *G06T 2207/20081* (2013.01); *G06T 2207/20084* (2013.01); *G06T 2207/20221* (2013.01); *G06T 2207/30201* (2013.01)
(58) Field of Classification Search
  CPC . G06T 2207/20084; G06T 2207/20221; G06T 2207/30201; G06N 3/0454; G06N 3/088
  See application file for complete search history.

(56) References Cited

U.S. PATENT DOCUMENTS

| | | | | |
|---|---|---|---|---|
| 2019/0332900 | A1* | 10/2019 | Sjolund | G06T 9/001 |
| 2019/0378242 | A1* | 12/2019 | Zhang | G06T 3/4061 |
| 2020/0090359 | A1* | 3/2020 | Pillai | G06T 7/50 |
| 2020/0210770 | A1* | 7/2020 | Bala | G06K 9/6257 |

OTHER PUBLICATIONS

"Poisson Image Editing" by Patrick Perez, Michel Gangnet, and Andrew Blake. (ACM 2003).
"Progressive Growing of Gans for Improved Quality, Stability, and Variation" by Karras et al. (Feb. 2018).
"Real-time Expression Transfer for Facial Reenactment" by Thies et al.
"FaceForensics++: Learning to Detect Manipulated Facial Images" by Rossler et al. (2019).
"RSGAN: Face Swapping and Editing using Face and Hair Representation in Latent Spaces" by Ryota Natsume, Tatsuya Yatagawa, and Shigeo Morishima. (Apr. 2018).
"State of the Art on Monocular 3D Face Reconstruction, Tracking, and Applications" by Zollhofer et al. (STAR 2018).
"Synthesizing Obama: Learning Lip Sync from Audio" by Suwajanakorn et al. (ACM Jul. 2017).
"The First Facial Landmark Tracking in-the-Wild Challenge: Benchmark and Results" by Shen et al.
"Face2Face: Real-time Face Capture and Reenactment of RGB Videos" by Thies et al.
"Unsupervised Image-to-Image Translation with Generative Adversarial Networks" by Hao Dong, Paarth Neekhara, and Chao Wu. (Jan. 2017).
"Unsupervised Image-to-Image Translation Networks" by Ming-Yu Liu, Thomas Breuel, and Jan Kautz. (NIPS 2017).
"VDub: Modifying Face Video of Actors for Plausible Visual Alignment to a Dubbed Audio Track" by Garrido et al. (The Eurographics Association 2015).
"Conceptual and Methodological Issues in the Judgment of Facial Expressions of Emotion" by Erika L. Rosenberg and Paul Ekman. (Plenum Publishing Corporation 1995).
"A Morphable Model for the Synthesis of 3D Faces" by Volker Blanz and Thomas Vetter. (ACM 1999).
"A Multiresolution Spline With Application to Image Mosaics" by Peter J. Burt and Edward H. Adelson. (ACM 1983).
"A Style-Based Generator Architecture for Generative Adversarial Networks" by Tero Karras, Samuli Laine, and Timo Aila.
"ADAM: A Method for Stochastic Optimization" by Diederik P. Kingma and Jimmy Lei Ba. (Jan. 2017).

"Creating a Photoreal Digital Actor: The Digital Emily Project" by Alexander et al. (2009).
"Deep Video Portraits" by Kim et al. (ACM 2018).
"Exchanging Faces in Images" by Volker Blanz, Kristina Scherbaum, Thomas Vetter, and Hans-Peter Seidel. (Blackwell Publishing 2004).
"Expression Flow for 3D-Aware Face Component Transfer" by Yang et al. (ACM 2011).
"EyeOpener: Editing Eyes in the Wild" by Shu et al. (ACM Sep. 2016).
"Face Swapping under Large Pose Variations: a 3D Model Based Approach" by Yuan Lin, Shengjin Wang, Qian Lin, and Feng Tang. (Jul. 2012).
"FSNet: An Identity-Aware Generative Model for Image-based Face Swapping" by Ryota Natsume, Tatsuya Yatagawa, and Shigeo Morishima, (Nov. 2018).
"GANimation: Anatomically-aware Facial Animation from a Single Image" by Pumarola et al. (2018).
"Global Contrast Factor—a New Approach to Image Contrast" by Kresimir Matkovic, Laszlo Neumann, Attila Neumann, Thomas Psik, and Werner Purgathofer. (The Eurographics Association 2005).
"Image Quality Assessment: From Error Visibility to Structural Similarity" by Wang et al. (Apr. 2004).
"Image-to-Image Translation with Conditional Adversarial Networks" by Phillip Isola, Jun-Yan Zhu, Tinghui Zhou, and Alexei A. Efros. (2017).
"Image-to-Image Translation with Conditional Adversarial Networks" by Phillip Isola, Jun-Yan Zhu, Tinghui Zhou, and Alexei A. Efros. (Nov. 2018).
"Joint face alignment and segmentation via deep multi-task learning" by Yucheng Zhao, Fan Tang, Weiming Dong, Feiyue Huang, and Xiaopeng Zhang. (Springer Science+Business Media 2018).
"A Style-Based Generator Architecture for Generative Adversarial Networks" by Tero Karras, Samuli Laine, and Timo Aila. (2019).
"Fast Face-swap Using Convolutional Neural Networks" by Iryna Korshunova, Wenzhe Shi, Joni Dambre, and Lucas Theis. (2017).
"Deep Alignment Network: A convolutional neural network for robust face alignment" by Marek Kowalski, Jacek Naruniec, and Tomasz Trzcinski. (2017).
"Multi-Scale Structural Similarity for Image Quality Assessment" by Zhou Wang, Eero P. Simoncelli, and Alan C. Bovik. (2003).
"Neural Style-Preserving Visual Dubbing" by Kim et al. (ACM Nov. 2019).
"FSGAN: Subject Agnostic Face Swapping and Reenactment" by Yuval Nirkin, Yosi Keller, and Tal Hassner. (2019).
"Nonlinear 3D Face Morphable Model" by Luan Tran and Xiaoming Liu.
"Video Face Replacement" by Dale et al. (ACM Dec. 2011).
"Video Face Swap Based on Autoencoder Generation Network" by Yan et al. (IEEE 2018).
"Video-to-Video Synthesis" by Wang et al. (Dec. 2018).
"Warp-Guided GANs for Single-Photo Facial Animation" by Geng et al. (ACM 2018).
"What the Face Reveals: Basic and Applied Studies of Spontaneous Expression Using the Facial Action Coding System (FACS)" by Paul Ekman and Erika Rosenberg.
Few-Shot Adversarial Learning of Realistic Neural Talking Head Models by Zakharov et al. (2019).
"Unpaired Image-to-Image Translation using Cycle-Consistent Adversarial Networks" by Zhu et al. (2017).
"FSNet: An Identity-Aware Generative Model for Image-Based Face Swapping" by Natsume et al. (Asian Conference on Computer Vision 2018).

* cited by examiner

| Lvl | Encoder | Activation | Output shape | Params |
|---|---|---|---|---|
| 8 | Input Image~336 | - | 3 × 1024 × 1024 | - |
|   | Conv 1 × 1 | LeakyReLU | 16 × 1024 × 1024 | 64 |
|   | Conv 3 × 3 | LeakyReLU | 16 × 1024 × 1024 | 2.3k |
|   | Conv 3 × 3 | LeakyReLU | 32 × 1024 × 1024 | 4.6k |
|   | Downsample | - | 32 × 512 × 512 | - |
| 7 | Conv 3 × 3 | LeakyReLU | 32 × 512 × 512 | 9.2k |
|   | Conv 3 × 3 | LeakyReLU | 64 × 512 × 512 | 18k |
|   | Downsample | - | 64 × 256 × 256 | - |
| 6 | Conv 3 × 3 | LeakyReLU | 32 × 256 × 256 | 37k |
|   | Conv 3 × 3 | LeakyReLU | 128 × 256 × 256 | 74k |
|   | Downsample | - | 128 × 128 × 128 | - |
| 5 | Conv 3 × 3 | LeakyReLU | 128 × 128 × 128 | 148k |
|   | Conv 3 × 3 | LeakyReLU | 256 × 128 × 128 | 295k |
|   | Downsample | - | 256 × 64 × 64 | - |
| 4 | Conv 3 × 3 | LeakyReLU | 256 × 64 × 64 | 590k |
|   | Conv 3 × 3 | LeakyReLU | 512 × 64 × 64 | 1.2M |
|   | Downsample | - | 512 × 32 × 32 | - |
| 3 | Conv 3 × 3 | LeakyReLU | 512 × 32 × 32 | 2.4M |
|   | Conv 3 × 3 | LeakyReLU | 512 × 32 × 32 | 2.4M |
|   | Downsample | - | 512 × 16 × 16 | - |
| 2 | Conv 3 × 3 | LeakyReLU | 512 × 16 × 16 | 2.4M |
|   | Conv 3 × 3 | LeakyReLU | 512 × 16 × 16 | 2.4M |
|   | Downsample | - | 512 × 8 × 8 | - |
| 1 | Conv 3 × 3 | LeakyReLU | 512 × 8 × 8 | 2.4M |
|   | Conv 3 × 3 | LeakyReLU | 512 × 8 × 8 | 2.4M |
|   | Downsample | - | 512 × 4 × 4 | - |
| 0 | Conv 3 × 3 | LeakyReLU | 512 × 4 × 4 | 2.4M |
|   | Conv 4 × 4 | LeakyReLU | 512 × 1 × 1 | 4.M |
|   | Latent vector~344 | - | 512 × 1 × 1 | 513 |
|   |   |   |   | 23.1M |

| Lvl | Decoder | Activation | Output shape | Params |
|---|---|---|---|---|
| 0 | Latent vector ~344 | - | $512 \times 1 \times 1$ | - |
|   | Conv $4 \times 4$ | LeakyReLU | $512 \times 4 \times 4$ | 4.2M |
|   | Conv $3 \times 3$ | LeakyReLU | $512 \times 4 \times 4$ | 2.4M |
| 1 | Upsample | - | $512 \times 8 \times 8$ | - |
|   | Conv $3 \times 3$ | LeakyReLU | $512 \times 8 \times 8$ | 2.4M |
|   | Conv $3 \times 3$ | LeakyReLU | $512 \times 8 \times 8$ | 2.4M |
| 2 | Upsample | - | $512 \times 16 \times 16$ | - |
|   | Conv $3 \times 3$ | LeakyReLU | $512 \times 16 \times 16$ | 2.4M |
|   | Conv $3 \times 3$ | LeakyReLU | $512 \times 16 \times 16$ | 2.4M |
| 3 | Upsample | - | $512 \times 32 \times 32$ | - |
|   | Conv $3 \times 3$ | LeakyReLU | $512 \times 32 \times 32$ | 2.4M |
|   | Conv $3 \times 3$ | LeakyReLU | $512 \times 32 \times 32$ | 2.4M |
| 4 | Upsample | - | $512 \times 64 \times 64$ | - |
|   | Conv $3 \times 3$ | LeakyReLU | $256 \times 64 \times 64$ | 1.2M |
|   | Conv $3 \times 3$ | LeakyReLU | $256 \times 64 \times 64$ | 590k |
| 5 | Upsample | - | $256 \times 128 \times 128$ | - |
|   | Conv $3 \times 3$ | LeakyReLU | $128 \times 128 \times 128$ | 295k |
|   | Conv $3 \times 3$ | LeakyReLU | $128 \times 128 \times 128$ | 148k |
| 6 | Upsample | - | $128 \times 256 \times 256$ | - |
|   | Conv $3 \times 3$ | LeakyReLU | $64 \times 256 \times 256$ | 74k |
|   | Conv $3 \times 3$ | LeakyReLU | $64 \times 256 \times 256$ | 37k |
| 7 | Upsample | - | $64 \times 512 \times 512$ | - |
|   | Conv $3 \times 3$ | LeakyReLU | $32 \times 512 \times 512$ | 18k |
|   | Conv $3 \times 3$ | LeakyReLU | $32 \times 512 \times 512$ | 9.2k |
| 8 | Upsample | - | $32 \times 1024 \times 1024$ | - |
|   | Conv $3 \times 3$ | LeakyReLU | $16 \times 1024 \times 1024$ | 4.6k |
|   | Conv $3 \times 3$ | LeakyReLU | $16 \times 1024 \times 1024$ | 2.3k |
|   | Conv $1 \times 1$ | sigmoid | $3 \times 1024 \times 1024$ | 51 |
|   |   |   |   | 23.1M |

| Synthesis of Source Image with Target Image |
|---|

Input: *source* image $S$ and *target* image $T$ of equal sizes, set of outer facial landmarks $L$ in image $T$, standard deviation $\sigma$, generated face image resolution $r$ (in our case 1024)
Output: blended *output* image $O$
$n = log_2(r)$;
Decompose *source* image $S$ and *target* image $T$ into corresponding Laplacian pyramids $P(S)_i$ and $P(T)_i$, where $i$ is a pyramid level, $i \in \langle 1, n \rangle$;
Initialize output pyramid $P(O)$ for output image $O$ of the same sizes as $P(T)$ and fill its values with zeroes;
for $i = 1$ to $n$ do
    Compute background mask $\hat{M}_i$ defined as an image of the same size as $P(T)_i$, where all pixels in the interior of the polygon formed by $L$ are equal to 0 and 1 otherwise;
    $\hat{M}_i = G\left(\hat{M}_i, \sigma\right)$, where $G\left(\hat{M}_i, \sigma\right)$ denotes gaussian smoothing of $\hat{M}_i$ with standard deviation $\sigma$;
    Calculate face mask: $M_i = 1 - \hat{M}_i$;
    Copy background from the *target* image to the *output* image:
    $P(O)_i = P(O)_i + \hat{M}_i P(T)_i$ ;
    if $i \leq 2$ then
        Copy face from the *target* image to the *output* image:
        $P(O)_i = P(O)_i + M_i P(T)_i$;
    else
        Copy face from the *source* image to the *output* image:
        $P(O)_i = P(O)_i + M_i P(S)_i$ ;
    end
    Reconstruct and return output image $O$ from $P(O)$;
end

Fig. 5

AUTOMATED IMAGE SYNTHESIS USING A COMB NEURAL NETWORK ARCHITECTURE

RELATED APPLICATION(S)

The present application claims the benefit of and priority to Provisional Patent Application Ser. No. 62/850,439, filed May 20, 2019, and titled "Comb Networks for High-Resolution, Multi-Subject Face Swapping," which is hereby incorporated fully by reference into the present application.

BACKGROUND

The transfer of a visual image from a source to a target domain is an important problem in visual effects. One exemplary application of such image transfer involves the transfer of a performance from a target performer to a source actor, which may be necessary if the source actor is deceased or must be portrayed at a different age.

Unfortunately, many conventional approaches to performing image transfer produce low resolution images with heavy artifacting. Although techniques for producing higher resolution images exist, they are typically time consuming and painstakingly manual processes, requiring the careful structuring of filmed scenes, the placement of physical landmarks on the target performer, and manual fitting of a computer generated likeness on the target performer's face. Moreover, despite the higher resolution achievable using such manual and costly methods, an uncanny aesthetic effect often remains.

SUMMARY

There are provided systems and methods for performing automated image synthesis using a comb neural network architecture, substantially as shown in and/or described in connection with at least one of the figures, and as set forth more completely in the claims.

BRIEF DESCRIPTION OF THE DRAWINGS

FIG. 3A shows implementational details of a neural encoder suitable for inclusion in the image synthesis software code shown in FIG. 2, according to one implementation;

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing automated image synthesis using a substantially unsupervised deep learning model implemented using a comb neural network architecture. The present solution requires only unpaired observations of target and source images, which may be still images or video sequences that are then automatically processed and aligned. The deep learning model disclosed herein employs a comb shaped architecture for encoding target and source images in a shared latent space and then splits into specialist neural decoders, one for the target and one for the source. When used to transfer a performance from a target actor to a source performer, for example, the target image is encoded and then decoded as the source, creating an image that has the appearance of the source while matching the performance of the target.

That is to say, the present application is directed to disclosure of a model trained to transfer physical characteristics of a source actor, such as voice, physical build, and facial features, for example, onto a target behavioral performance. Thus, as used herein, the "source" provides the identity of a synthesized image while the "target" provides the behavior that the synthesized image appearing to be the source executes.

The present image synthesis solution utilizes a progressive training regime to train the deep learning model. That progressive training is initiated with low-resolution images and gradually builds up to high-resolution. The progressive training approach disclosed in the present application not only speeds training but also advantageously enables the present solution to greatly surpass the resolutions achievable by the conventional art. In addition, the present solution incorporates style-matching constraints and image-fusion enhancements to produce natural looking results largely free of artifacts.

It is noted that, as used in the present application, the terms "automation," "automated", and "automating" refer to systems and processes that do not require the participation of a human user, such as a human editor or artist. Although, in some implementations, a human editor or artist may review a synthesized image produced by the automated systems and according to the automated methods described herein, that human involvement is optional. Thus, the methods described in the present application may be performed under the control of hardware processing components of the disclosed automated systems.

It is further noted that, as defined in the present application, a neural network (NN), also known as an artificial neural network (ANN), is a type of machine learning framework in which patterns or learned representations of observed data are processed using highly connected computational layers that map the relationship between inputs and outputs. A "deep neural network", in the context of deep learning, may refer to a neural network that utilizes multiple hidden layers between input and output layers, which may allow for learning based on features not explicitly defined in raw data. "Online deep learning" may refer to a type of deep learning in which machine learning models are updated using incoming data streams, and are designed to progressively improve their performance of a specific task as new data is received and/or adapt to new patterns of a dynamic system. As such, various forms of ANNs may be used to make predictions about new data based on past examples or "training data." In various implementations, ANNs may be utilized to perform image processing or natural-language processing.

Figure 1:
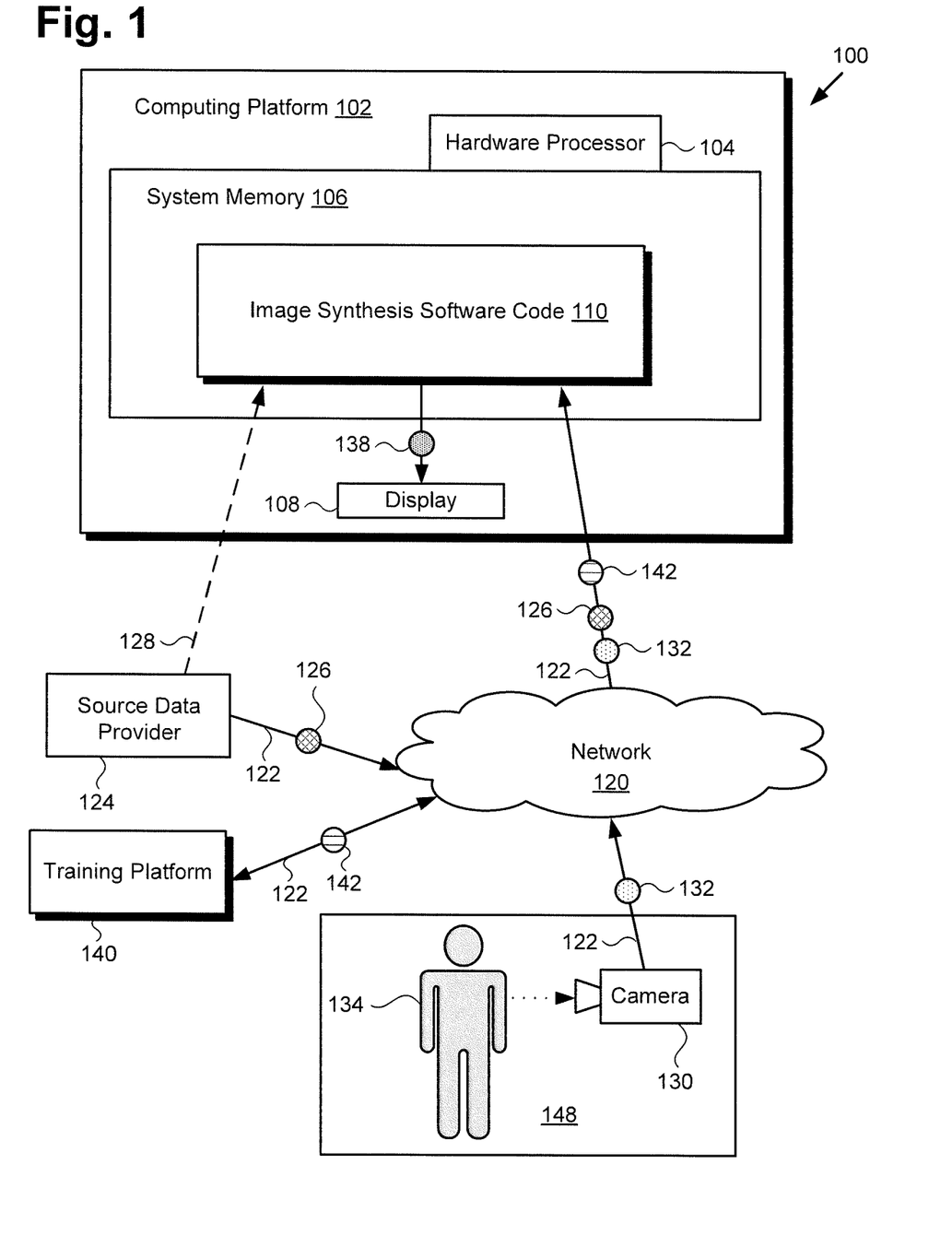
FIG. 1 shows a diagram of an exemplary system for performing automated image synthesis using a comb neural network architecture, according to one implementation.

FIG. 1 shows a diagram of an exemplary system for performing automated image synthesis using a comb neural network architecture, according to one implementation. As shown in FIG. 1, image synthesis system 100 includes computing platform 102 having hardware processor 104, system memory 106 implemented as a non-transitory storage device storing image synthesis software code 110, and may include display 108. It is noted that display 108 may be implemented as a liquid crystal display (LCD), a light-emitting diode (LED) display, an organic light-emitting diode (OLED) display, or another suitable display screen that performs a physical transformation of signals to light.

Figure 2:
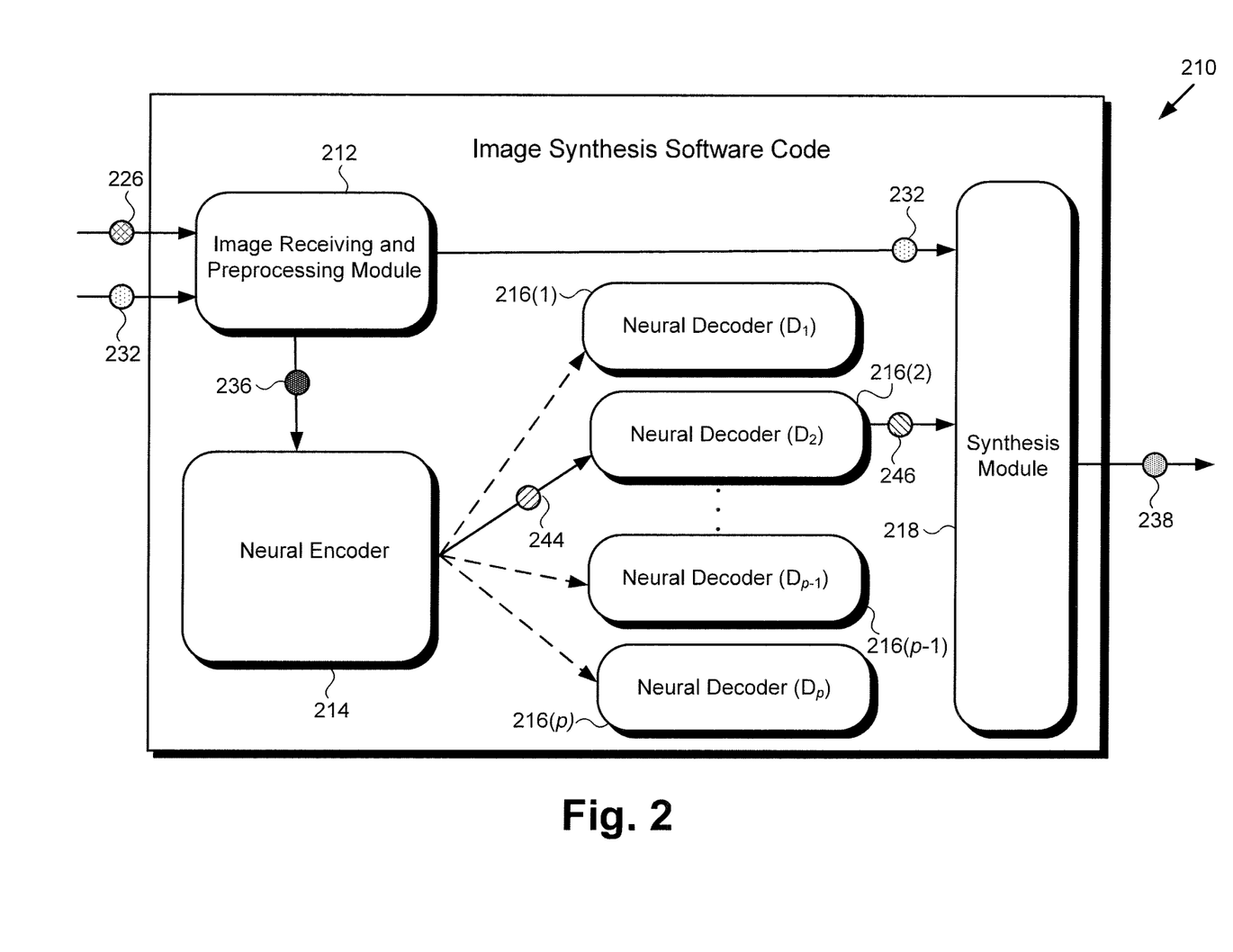
FIG. 2 shows an exemplary image synthesis software code suitable for use by the system shown in FIG. 1, according to one implementation.

It is also noted that, as shown by FIG. 2, and described below, image synthesis software code 110 implements a comb shaped neural network architecture configured to produce one or more synthesized images (hereinafter "synthesized image(s)") 138 in an automated process. As further shown in FIG. 1, image synthesis system 100 is implemented within a use environment including source data provider 124 providing source data 126, training platform 140 providing training data 142, performance venue 148, and communication network 120.

Performance venue 148 is shown to include target performer 134 and camera 130 used to obtain target image data 132. Camera 130 may include one or more still image red-green-blue (RGB) camera(s), and/or one or more RGB video camera(s), for example. Also shown in FIG. 1 are network communication links 122 communicatively coupling source data provider 124, training platform 140, and camera 130 with image synthesis system 100 via communication network 120. It is noted that although image synthesis system 100 may receive source data 126 from source data provider 124 via communication network 120 and network communication links 122, in some implementations, source data provider 124 may take the form of a source data database integrated with computing platform 102, or may be in direct communication with image synthesis system 100 as shown by dashed communication link 128.

Image synthesis software code 110, when executed by hardware processor 104 of computing platform 102, is configured to produce synthesized image(s) 138 based on target image data 132 and source data 126. It is noted that, although the present application refers to image synthesis software code 110 as being stored in system memory 106 for conceptual clarity, more generally, system memory 106 may take the form of any computer-readable non-transitory storage medium.

The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts training platform 140 as a computer platform remote from image synthesis system 100, that representation is also merely exemplary. More generally, image synthesis system 100 may include one or more computing platforms, such as computer servers for example, which may form an interactively linked but distributed system, such as a cloud based system, for instance. As a result, hardware processor 104 and system memory 106 may correspond to distributed processor and memory resources within image synthesis system 100, while training platform 140 may be a component of image synthesis system 100 or may be implemented as a software module stored in system memory 106. In one such implementation, computing platform 102 of image synthesis system 100 may correspond to one or more web servers, accessible over a packet-switched network such as the Internet, for example. Alternatively, computing platform 102 may correspond to one or more computer servers supporting a wide area network (WAN), a local area network (LAN), or included in another type of limited distribution or private network.

It is also noted that although the present inventive principles are described below by reference to a specific use case in which a source facial appearance is transferred onto a target behavioral performance, also known as "face swapping," that implementation is discussed in the interests of conceptual clarity and is not intended to limit the scope of the disclosed concepts. Beyond its applicability to visual effects, such as face swapping, the present solution has applications to the broader field of learning disentangled representations from data. In particular, the present solution successfully separates information about dynamic behavior (e.g., the encoded facial performance or content) from static information (e.g., the identity of the face or style) without the need for sequentially ordered data or an explicit sequence model.

With respect to the exemplary use case of face swapping, a standard face-swapping application will typically have a single target and a single source. In the encoder-decoder framework, this leads to four possible coding paths: (1) target to target, (2) source to source, (3) target to source, and (4) source to target. The present image synthesis solution generalizes this approach to P identities or personas (hereinafter "personas"), leading to $P^2$ possible coding paths in a single model.

By way of overview, the present solution approaches transformation in the following way: Images from all P personas are embedded in a shared latent space using a common encoder. These embeddings are then mapped back into pixel space using P specialized decoders, one for each persona having a latent space representation. In other words, the pth decoder is used to create an image of the pth persona. When the persona going into the encoder matches the assignment of the decoder, the coding path is identical to that of a standard autoencoder. When the personas differ, a face swap is performed.

FIG. 2 shows exemplary image synthesis software code 210 suitable for use by image synthesis system 100 in FIG. 1, according to one implementation. As shown in FIG. 2, image synthesis software code 210 includes image receiving and preprocessing module 212, and neural encoder 214 implemented as an ANN. Image synthesis software code 210 further includes multiple neural decoders 216(1), 216(2), . . . 216(p−1), 216(p), where P is an integer value greater than one (P>1), (hereinafter "neural decoders 216 (1)-216(p)") implemented as respective ANNs, and synthesis module 218. Thus, neural decoders 216(1)-216(p) of image synthesis software code 210 include at least two neural decoders. Moreover, in some implementations, neural decoders 216(1)-216(p) of image synthesis software code 210 include at least three neural decoders, and may include tens or even hundreds of neural decoders coupled to shared neural encoder 214.

In addition, FIG. 2 shows source data 226 and target image data 232 received as inputs to image synthesis software code 210, and one or more synthesized images (hereinafter "synthesized image(s)") 238 provided as an output by image synthesis software code 210. Also shown in FIG. 2 are input 236 to neural encoder 214 (hereinafter "input image 236") that includes target image data 232 and source data 226 identifying a persona corresponding to one of neural decoders 216(1)-216(p), latent vector 244 carrying the latent space representation of target image data 232, and swapped image data 246 produced by one of neural decoders 216(p−1), 216(p), e.g., neural decoder 216(2), based on latent vector 244. It is noted that, as shown in FIG. 2, although only one of neural decoders 216(1)-216(p) receives latent vector 244 from neural encoder 214, neural decoders 216(1)-216(p) are coupled in parallel to the output of neural encoder 214.

Source data 226, target image data 232, image synthesis software code 210, and synthesized image(s) 238 correspond respectively in general to source data 126, target image data 132, image synthesis software code 110, and synthesized image(s) 138, in FIG. 1. That is to say, source data 126, target image data 132, image synthesis software code 110, and synthesized image(s) 138 may share any of the characteristics attributed to respective source data 226, target image data 232, image synthesis software code 210, and synthesized image(s) 238 by the present disclosure, and vice versa. Thus, although not shown in FIG. 1, image synthesis software code 110 may include features corresponding respectively to image receiving and preprocessing module 212, neural encoder 214, neural decoders 216(1)-216(p), and synthesis module 218.

It is noted that neural encoder 214 and multiple neural decoders 216(1)-216(p) form a comb shaped neural network architecture in which latent vector 244 encoded and output by neural encoder 214 may be selectively provided as an input to any one of neural decoders 216(1)-216(p). In some use cases, neural encoder 214 and each of neural decoders 216(1)-216(p) may be implemented using respective ANNs in the form of convolutional neural networks (CNNs), for example.

Figure 3B:
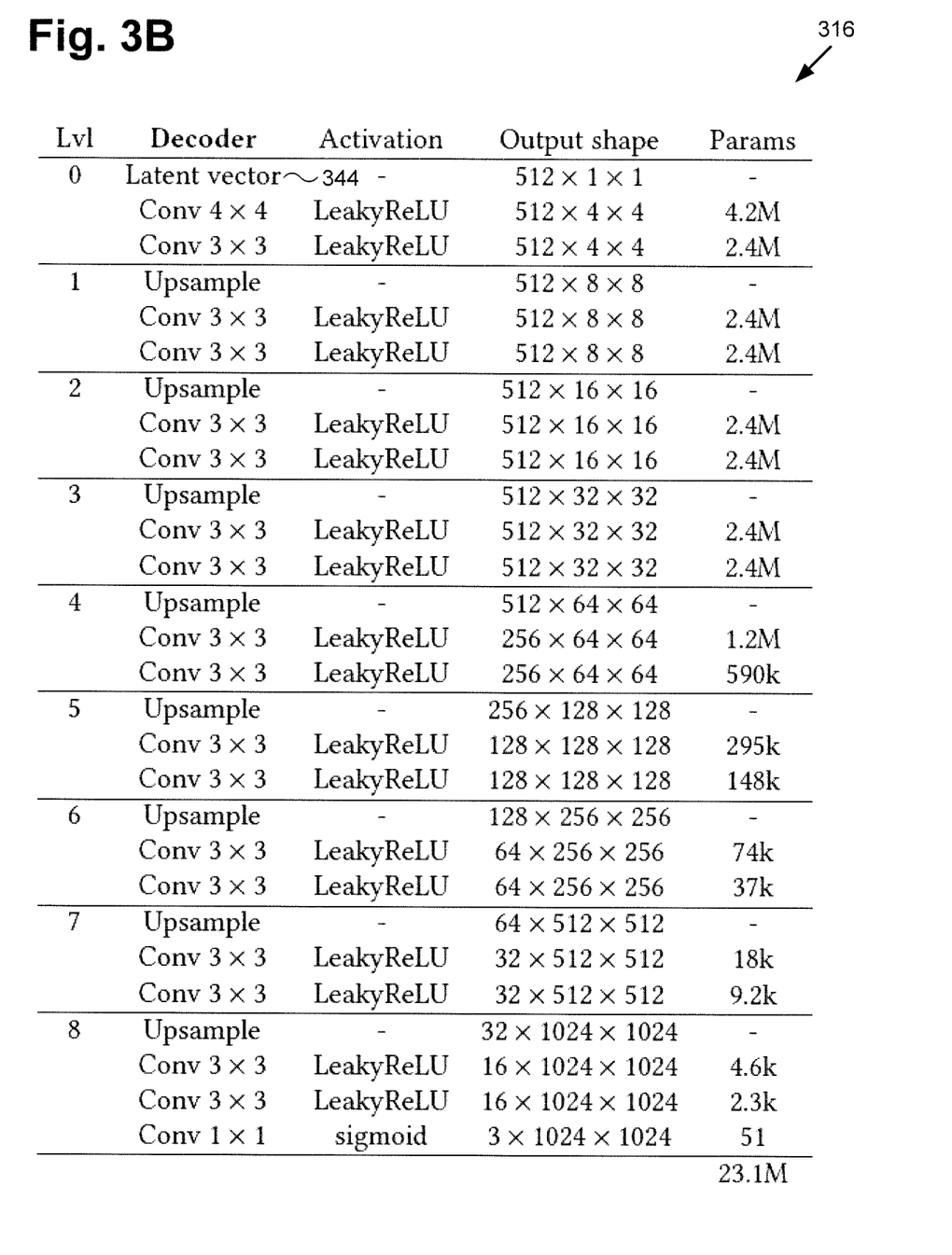
FIG. 3B shows implementational details of any one of multiple neural decoders suitable for inclusion in the image synthesis software code shown in FIG. 2, according to one implementation.

FIG. 3A shows implementational details of CNN encoder 314, according to one implementation, while FIG. 3B shows implementational details of exemplary CNN decoder 316. As shown in FIGS. 3A and 3B, CNN encoder 314 receives input image 336 and outputs latent vector 344 as an input to CNN decoder 316.

CNN encoder 314, input image 336, and latent vector 344 correspond respectively in general to neural encoder 214, input image 236, and latent vector 244 in FIG. 2, while CNN decoder 316 corresponds in general to each of neural decoders 216(1)-216(p). That is to say, neural encoder 214, input image 236, and latent vector 244 may share any of the characteristics attributed to respective CNN encoder 314, input image 336, and latent vector 344 by the present disclosure, and vice versa. Moreover, each of neural decoders 216(1)-216(p) may share any of the characteristics attributed to CNN decoder 316 by the present disclosure, and vice versa. It is noted that in some implementations, the parameter "α" of the Leaky rectified linear unit (LeakyReLU) identified in FIGS. 3A and 3B (hereinafter "$\alpha_{ReLU}$") may be set at $\alpha_{ReLU}$=0.2.

Figure 4:
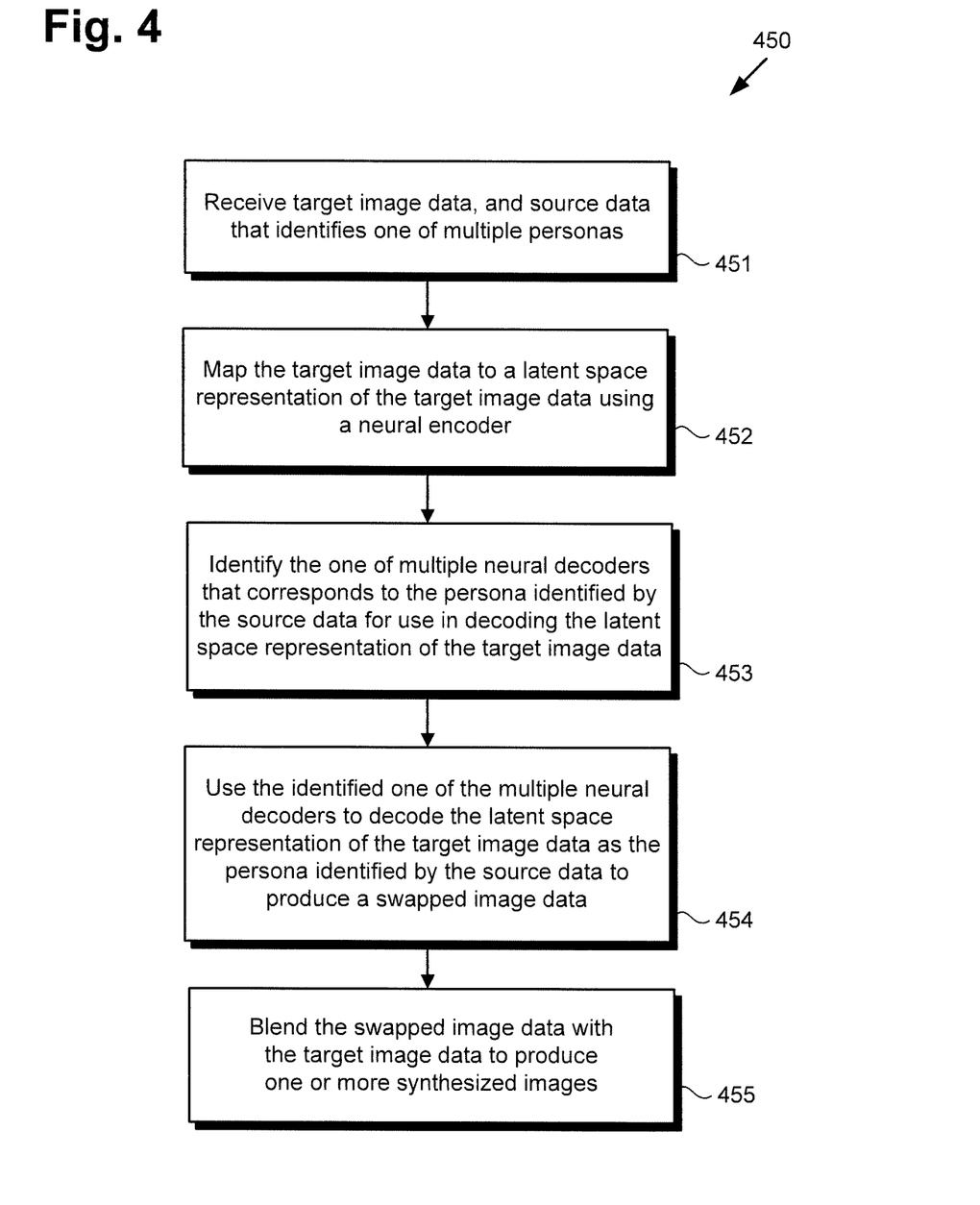
FIG. 4 shows a flowchart presenting an exemplary method for performing automated image synthesis using a comb neural network architecture, according to one implementation.

The functionality of image synthesis system 100 including image synthesis software code 110/210 will be further described by reference to FIG. 4 in combination with FIGS. 1, 2, 3A, and 3B. FIG. 4 shows flowchart 450 presenting an exemplary method for use by a system to perform automated image synthesis using a comb neural network architecture. With respect to the method outlined in FIG. 4, it is noted that certain details and features have been left out of flowchart 450 in order not to obscure the discussion of the inventive features in the present application.

As a preliminary matter, image synthesis software code 110/210 including neural encoder 214/314 and neural decoders 216(1)-216(p)/316 is trained using training platform 140 and training data 142. As noted above, a progressive training approach is used to train the various levels or blocks of the comb shaped neural network architecture implemented by image synthesis software code 110/210.

Progressive training begins training on very low-resolution images, for example 4×4 pixel images, in order to orient the network, and then gradually expands the network's capacity as higher resolution images are used for training. For each level of progressive training, a new level of the network is added, that is, a level containing a composition of two convolutional layers and a down-scaling or up-scaling layer in neural encoder 214/314 and neural decoders 216(1)-216(p)/316, respectively. In other words, neural encoder 214/314 and neural decoders 216(1)-216(p)/316 are trained progressively, beginning with low-resolution training data 142 and continuing with progressively higher resolution training data 142 until a training output image meeting a predetermined resolution threshold is synthesized.

The perturbation to the network caused by adding new, untrained network components may be attenuated by a gain parameter, $\alpha \in [0, 1]$ that acts as a fader switch that gradually blends the activations of the new network components with those of the already trained, smaller network. According to some implementations, each of neural decoders 216(1)-216(p)/316 in the comb architecture is progressively grown along with neural encoder 214/314. In one implementation, during the first two stages of growth, which correspond to the first two encoder and decoder levels of neural encoder 214/314 and neural decoders 216(l)-216(p)/316, the decoder weights are tied to enforce consistency in the latent space.

Thus, each of neural decoders 216(1)-216(p)/316 includes multiple decoder levels each associated with a respective weighting factor, where the respective weighting factors for some decoder levels, e.g., the first and second decoder levels, are tied together across all of neural decoders 216(1)-216(p)/316. In those implementations, the decoder weights may be trained independently from the third level on. The same blending weight α may be used across all P neural decoders.

Training data 142 may be partitioned into P subsets, where each subset represents the individual persona corresponding to a respective one of neural decoders 216(1)-216(p)/316. It is noted that the partitioning of training data 142 into P subsets constitutes a form of light supervision in the present training approach. However, all other training steps are unsupervised.

Let $x_p(t_p)$ be the $t_p$th image belonging to persona p. Since the present deep learning model is agnostic to data ordering, the $t_p$ index is hereinafter dropped to avoid notational clutter. All P personas corresponding respectively to neural decoders 216(1)-216(p)/316 are encoded, E, via shared neural encoder 214/314, and the P decoders, $D_p$, $p \in [1, P]$, are created to produce the pixel space basis representations of the personas. This results in $\tilde{x}_p = D_p(E(x_p)) \approx x_p$.

A naïve approach to training enforces specialization in P neural decoders 216(1)-216(p)/316 by denying them any training signal for all inputs $x_q$ where $q \neq p$. This way, each of neural decoders 216(1)-216(p)/316 would never actually "see" any training data 142 other than that for their respectively corresponding persona and therefore could not form a basis for anything other than those respective personas. However, such an approach is undesirable because it creates problems during training and is consequently avoided in the present progressive training scheme.

Decoding is ultimately about associating an input code with an output, and a sufficiently powerful decoder need only be able to tell its inputs apart in order to approximately invert them back into image space. Because neural encoder 214/314 and neural decoders 216(1)-216(p)/316 are all initialized randomly, there is nothing to privilege one decoder's interpretation of the latent space from another's during the early stages of training. If neural decoders 216(1)-216(p)/316 were trained using the naïve approach described above, they would essentially be trained separately, and the training signal from one of neural decoders 216(1)-216(p)/316 could effectively overwrite the progress from training another of neural decoders 216(1)-216(p)/316. One solution to this problem is to enforce a global interpretation of the latent space by tying together the weights of the first few levels of the decoders, as noted above. That solution enforces a consistent association with the latent code across all P neural decoders 216(1)-216(p)/316.

According to one exemplary training strategy, each level or block is trained for $10^5$ iterations. During an iteration, the P personas corresponding respectively to neural decoders 216(1)-216(p)/316 are shuffled, a batch of images from that persona are selected, and a gradient update is performed. Training then moves to the next persona and the process is repeated. It is noted that this results in neural encoder 214/314 and all shared decoder weights receiving P gradient updates during a single iteration, while the independent decoder weights receive one update per iteration. The gain parameter a increases linearly such that it reaches 1 after L/2 iterations, where L is the total number of progressive training levels (see FIGS. 3A and 3B).

In one implementation, the level-dependent loss function used during training may be expressed as:

$$\mathcal{L}_l = \frac{1}{N} \sum_i^N f_l(x_p \odot m(x_p), \tilde{x}_p^{(p)}), \quad \text{(Equation 1)}$$

where, in the exemplary use case of face swapping, $x_p$ is the ground-truth image, $m(x_p)$ is the mask of the source face, $\tilde{x}_p^{(p)} = D_p(E(x_p))$ is the reconstruction, and $\odot$ represents elementwise multiplication. However, in implementations in which it is advantageous or desirable to be more invariant to the background in target image data 132/232, the following loss function may be used during training:

$$\mathcal{L}_l = \frac{1}{N} \sum_i^N f_l(x_p \odot m(x_p), \tilde{x}_p^{(p)} \odot m(x_p)), \quad \text{(Equation 2)}$$

For levels $0 \leq l \leq 2$, $f_l$ may be set to be SSIM, a structural similarity index introduced by Wang et al., and known in the art. According to one implementation, the input images are upscaled to 16×16 during the first two levels. For the remaining levels, $f_l$ may be set to be MS-SSIM, the multiscale version of SSIM, also introduced by Wang et al. and known in the art. The Adam optimizer known in the art may be used for training with a learning rate of $10^{-4}$. After reaching $10^5$ iterations in the final level, the learning rate may be decreased to $10^{-5}$. Once training is completed, image synthesis software code 110/210 may be utilized in an automated process to produce synthesized image(s) 138/238 based on source data 126/226 and target image data 132/232 as outlined by flowchart 450.

Referring now to FIG. 4 in combination with FIGS. 1, 2, 3A, and 3B, flowchart 450 begins with receiving target image data 132/232, and source data 126/226 that identifies one of multiple personas, where the multiple personas correspond respectively to neural decoders 216(1)-216(p)/316 of image synthesis software code 110/210 (action 451). In the exemplary use case of face swapping for performance transfer, for example, each of neural decoders 216(1)-216(p)/316 may correspond to a respective one of multiple personas in the form of specific male or female human actors or performers.

For instance, under some circumstances it may be advantageous or desirable to transfer a performance by a performer to another actor, or to transfer a performance by an actor having a certain age to that same actor at a different age, either younger or older. Other applications include stunt scenes that would be dangerous for an actor to perform but still require high quality facial images, as well as use cases in which the same actor plays multiple different roles concurrently, which requires manually painstaking and time consuming filming procedures in the conventional art.

Thus, in some implementations, target image data 132/232 includes a target facial representation and source data 126/226 identifies a facial representation of a persona corresponding to one of neural decoders 216(1)-216(p)/316. Moreover, in some implementations, target image data 132/232 depicts a performance by a first performer and source data 126/226 identifies a second performer. It is noted that in some implementations, target image data 132/232 may include a target still image, while in some implementations, target image data 132/232 may include a target video sequence.

Target image data 132/232 and source data 126/226 may be received by image synthesis software code 110/210 of image synthesis system 100, executed by hardware processor 104, and using image receiving and preprocessing module 212. As shown in FIG. 1, in one implementation, target image data 132/232 may be obtained by camera 130 of performance venue 148, and may be received by image synthesis system 100 from camera 130 via communication network 120 and network communication links 122.

Flowchart 450 continues with mapping target image data 132/232 to a latent space representation, i.e., latent vector 244/344, of target image data 132/232 using neural encoder 214/314 (action 452). Referring to FIGS. 2, 3A, and 3B, image receiving and preprocessing module 212 of image synthesis software code 110/210 receives target image data 132/232 and source data 126/226, and provides input image 236/336 to neural encoder 214/314. Image synthesis software code 110/210, when executed by hardware processor 104, performs an encoding process that maps target image data 132/232 to a latent space representation of target image data 132/232 that is then output to one of neural decoders 216(1)-216(p)/316 as latent vector 244/344.

In some implementations, it may be advantageous or desirable to preprocess target image data 132/232 prior to its encoding by neural encoder 214. Preprocessing of target image data 132/232 may include face alignment and may be based on facial landmarks identified in target image data 132/232, for example. Face alignment and other preprocessing steps may be performed using image receiving and preprocessing module 212 of image synthesis software code 110/210. Examples of facial landmarks suitable for use in face alignment may include the location of eye centers, eye corners, mouth corners, ear positions, and so forth.

For example, for target image data 132/232, a face may be detected and the facial landmarks may be localized. Target image data 132/232 may then be rotated and scaled so that the eyes lie on a line having a predetermined orientation and so as to have a predetermined interocular distance. Subsequent to the described rotating and scaling, target image data 132/232 may be cropped and resized, for example to 1024×1024 pixels. Input image 236/336 "$x_q$" including target image data 132/232 is fed into neural encoder 214/314 and mapped into its latent space representation "$z_q$", carried by latent vector 244/344, where $z_q=E(x_q)$.

With respect to face alignment, it is noted that the Deep Alignment Network introduced by Kowalski et al. and known in the art may be adequate for swapping faces in a single image. For video sequences, however, the normalization technique used in the Deep Alignment Network results in unsatisfactory temporal artifacts.

The artifacts are caused by rapid frame-to-frame shifts of the facial landmark positions at high resolution, since very small localization inconsistencies at 128×128 resolution are amplified at 1024×1024. To mitigate this undesired effect, the precision of facial landmark localization needs to be increased. To that end, in the present novel and inventive approach, an initial detection and alignment is performed and the width w of the face bounding box is noted. The location of the initially detected bounding box by βw pixels may then be translated in the eight principal directions of the image plane, each time performing a new face alignment, and the resulting nine sets of localized landmark points may be averaged. We have observed that using β=0.05 at 1024×1024 resolution removes substantially all detectable temporal artifacts.

Flowchart 450 continues with identifying one of neural decoders 216(1)-216(p)/316 for decoding the latent space representation of target image data 132/232 based on the persona identified by source data 126/226 (action 453). As discussed above, each of neural decoders 216(1)-216(p)/316 corresponds to a respective one persona. Action 453 corresponds to identifying, based on input image 236/336, the particular one of neural decoders 216(1)-216(p)/316 corresponding to the persona identified by source data 126/226.

According to the exemplary implementation shown in FIG. 2, neural decoder 216(2)/316 of neural decoders 216(1)-216(p)/316 is identified for decoding the latent space representation of target image data 132/232 carried by latent vector 244/344. Identification of neural decoder 216(2)/316 in action 453 may be performed by image synthesis software code 110/210, executed by hardware processor 104, and using one or both of image receiving and preprocessing module 212 and neural encoder 214/314.

Flowchart 450 continues with using the identified one of neural decoders 216(1)-216(p)/316, e.g., neural decoder 216(2)/316, to decode the latent space representation of target image data 132/232 carried by latent vector 244/344 as the persona identified by source data 126/226 to produce swapped image data 246 (action 454). Decoding of the latent space representation of target image data 132/232 carried by latent vector 244/344 to produce swapped image data 246 may be performed by image synthesis software code 110/210, executed by hardware processor 104, and using one of neural decoders 216(1)-216(p)/316. Swapped image data 246 may be expressed as "$\tilde{x}_p^{(q)}$", where $\tilde{x}_p^{(q)}=D_p(z_q)$.

Flowchart 450 can conclude with blending swapped image data 246 with target image data 132/232 to produce synthesized image(s) 138/238 of target image data 132/232 with the persona identified by source data 126/226 (action 455). Blending of swapped image data 246 with target image data 132/232 to produce synthesized image(s) 138/238 may be performed by image synthesis software code 110/210, executed by hardware processor 104, and using synthesis module 218. It is noted that, according to the novel and inventive automated image synthesis solution disclosed herein, synthesized image(s) 138/238 produced using image synthesis software code 110/210 may have megapixel resolution.

It is further noted that blending a generated face, for example, with an original image is a nontrivial task. Simply pasting a source face onto a target, even if the pose and facial expression are a perfect match, will typically result in inconsistent coloring and lighting as well as an obvious boundary between the source and target portions of the image. Many conventional approaches to blending use Poisson blending, which seeks to match the gradient of the pasted source region to that of the target region it is being pasted into. That conventional method can achieve a plausible result for still images. In a video sequence, however, if the boundary of the face changes from frame to frame, the strict boundary constraint imposed by the Poisson method can affect the lighting of the whole face, resulting in an unrealistic flickering effect.

Figure 5:
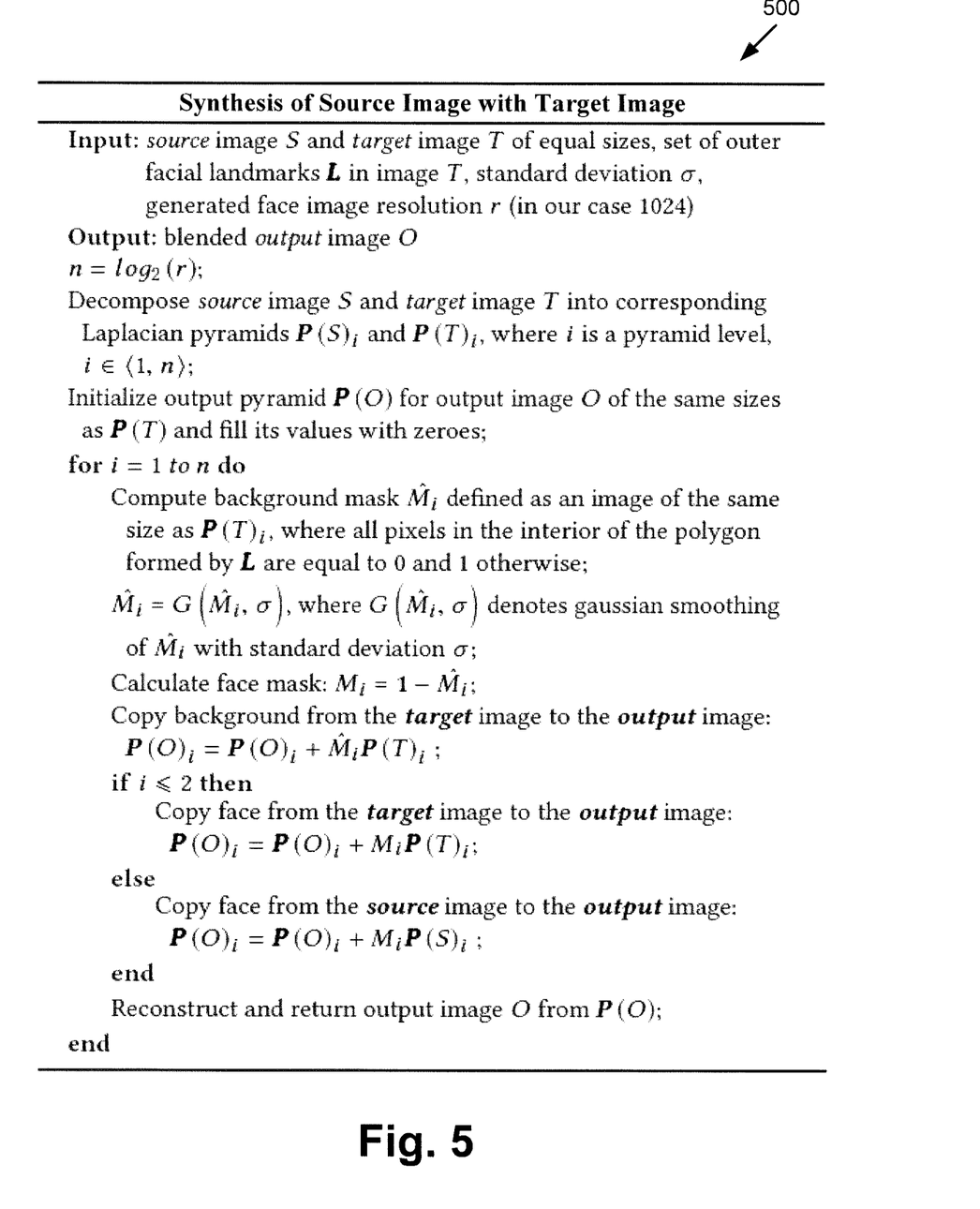
FIG. 5 shows pseudo code of an exemplary algorithm for use in performing automated image synthesis, according to one implementation.

According to the present inventive principles, an enhanced multi-band blending technique is introduced and used. Basic multi-band blending blends images at each level of a Laplacian pyramid and then reconstructs a final, smooth-boundary image. The enhanced multi-band blending introduced herein creates a custom Laplacian pyramid for output images by copying low-level components of the source-image pyramid to enforce the global image characteristics, and by propagating foreground and background masks through the pyramid. We enforce, that the boundary smoothing effect is propagated only in the interior direction of the image, e.g., the interior direction of a face. Consequently, the present enhanced multi-band blending technique ensures that the outer image outline, e.g., the outline of a face, would not be smoothed by the blending procedure. Pseudo code 500 of an exemplary algorithm for use in performing enhanced multi-band blending is shown in FIG. 5.

In implementations in which target image data 132/232 includes a target facial representation and source data 126/226 identifies a facial representation of a persona corresponding to one of neural decoders 216(1)-216(p)/316, synthesized image(s) 138/238 may substitute the facial representation of the persona for the target facial representation in target image data 132/232. In implementations in which target image data 132/232 depicts a performance by a first performer and source data 126/226 identifies a second performer, synthesized image(s) 138/238 may transfer the performance by the first performer to the second performer. In implementations in which target image data 132/232 includes a target video sequence, synthesized image(s) 138/

238 may include a sequence of synthesized video frames of the target video sequence with the persona identified by source data 126/226.

Although not included in flowchart 450, in some implementations, the present method can include rendering synthesized image(s) 138/238 on display 108 of image synthesis system 100. As noted above, display 108 may include an LCD, an LED display, an OLED display, or any other suitable display screen that performs a physical transformation of signals to light. Rendering of synthesized image(s) 138/238 on display 108 may be performed by image synthesis software code 110/210, executed by hardware processor 104 of computing platform 102.

Thus, the present application discloses systems and methods for performing automated image synthesis using a comb neural network architecture that overcome the drawbacks and deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An image synthesis system comprising:
    a computing platform having a hardware processor and a system memory storing a software code including a neural encoder and a plurality of neural decoders each corresponding to a respective one of a plurality of personas;
    the hardware processor configured to execute the software code to:
        receive a target image data, and a source data that identifies one of the plurality of personas;
        map the target image data to a latent space representation of the target image data using the neural encoder;
        identify one of the plurality of neural decoders for decoding the latent space representation of the target image data based on the one of the plurality of personas identified by the source data;
        use the identified one of the plurality of neural decoders to decode the latent space representation of the target image data as the one of the plurality of personas identified by the source data to produce a swapped image data; and
        blend the swapped image data with the target image data to produce one or more synthesized images.

2. The image synthesis system of claim 1, wherein the plurality of neural decoders comprise at least three neural decoders.

3. The image synthesis system of claim 1, wherein the plurality of neural decoders are coupled in parallel to an output of the neural encoder.

4. The image synthesis system of claim 1, wherein the neural encoder and each of the plurality of neural decoders comprise a convolutional neural network (CNN).

5. The image synthesis system of claim 1, wherein the target image data includes a target video sequence, and wherein the one or more synthesized images comprise a sequence of synthesized video frames of the target video sequence with the one of the plurality of personas identified by the source data.

6. The image synthesis system of claim 1, wherein the one or more synthesized images have megapixel resolution.

7. The image synthesis system of claim 1, wherein the target image data depicts a performance by a first performer and the source data identifies a second performer, and wherein the one or more synthesized images transfer the performance by the first performer to the second performer.

8. The image synthesis system of claim 1, wherein the target image data includes a target facial representation and the source data identifies a facial representation of the one of the plurality of personas, and wherein the one or more synthesized images substitute the facial representation of the one of the plurality of personas for the target facial representation in the target image data.

9. The image synthesis system of claim 1, wherein the neural encoder and the plurality of neural decoders are trained progressively, beginning with low resolution training data and continuing with progressively higher resolution training data until a training output image meeting a predetermined resolution threshold is synthesized.

10. The image synthesis system of claim 1, wherein each of the plurality of neural decoders comprises a plurality of decoder levels each associated with a respective weighting factor, and wherein the respective weighting factors for some decoder levels are tied together across all of the plurality of neural decoders.

11. A method for use by an image synthesis system including a computing platform having a hardware processor and a system memory storing a software code including a neural encoder and a plurality of neural decoders each corresponding to a respective one of a plurality of personas, the method comprising:
    receiving, by the software code executed by the hardware processor, a target image data, and a source data that identifies one of the plurality of personas;
    mapping, by the software code executed by the hardware processor, the target image data to a latent space representation of the target image data using the neural encoder;
    identifying, by the software code executed by the hardware processor, one of the plurality of neural decoders for decoding the latent space representation of the target image data based on the one of the plurality of personas identified by the source data;
    using the identified one of the plurality of neural decoders, by the software code executed by the hardware processor, to decode the latent space representation of the target image data as the one of the plurality of personas identified by the source data to produce a swapped image data; and
    blending, by the software code executed by the hardware processor, the swapped image data with the target image data to produce one or more synthesized images.

12. The method of claim 11, wherein the plurality of neural decoders comprise at least three neural decoders.

13. The method of claim 11, wherein the plurality of neural decoders are coupled in parallel to an output of the neural encoder.

14. The method of claim 11, wherein the neural encoder and each of the plurality of neural decoders comprise a convolutional neural network (CNN).

15. The method of claim 11, wherein the target image data includes a target video sequence, and wherein the one or more synthesized images comprise a sequence of synthesized video frames of the target video sequence with the one of the plurality of personas identified by the source data.

16. The method of claim 11, wherein the one or more synthesized images have megapixel resolution.

17. The method of claim 11, wherein the target image data depicts a performance by a first performer and the source data identifies a second performer, and wherein the one or more synthesized images transfer the performance by the first performer to the second performer.

18. The method of claim 11, wherein the target image data includes a target facial representation and the source data identifies a facial representation of the one of the plurality of personas, and wherein the one or more synthesized images substitute the facial representation of the one of the plurality of personas for the target facial representation in the target image data.

19. The method of claim 11, wherein the neural encoder and the plurality of neural decoders are trained progressively, beginning with low resolution training data and continuing with progressively higher resolution training data until a training output image meeting a predetermined resolution threshold is synthesized.

20. The method of claim 11, wherein each of the plurality of neural decoders comprises a plurality of decoder levels each associated with a respective weighting factor, and wherein the respective weighting factors for some decoder levels are tied together across all of the plurality of neural decoders.

* * * * *